No. 687,220. Patented Nov. 26, 1901.
T. T. GAFF & J. F. GENT.
GRAIN SEPARATING APPARATUS.
(Application filed May 24, 1901.)
(No Model.) 2 Sheets—Sheet 1.
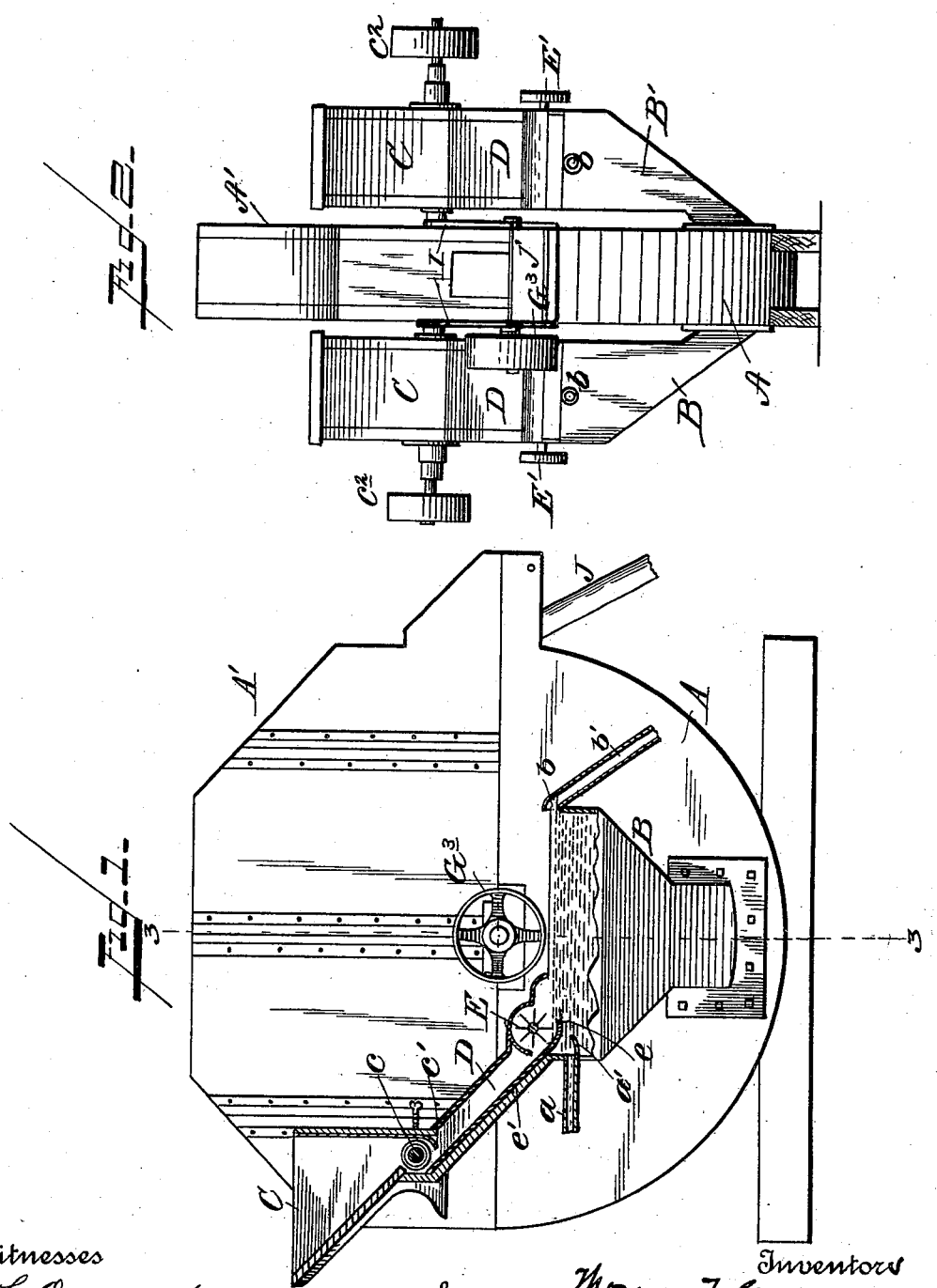
Witnesses
F. L. Orwand
Ewella Dick
Inventors
Thomas T. Gaff and
Joseph F. Gent
by Marcellus Bailey, Attorney

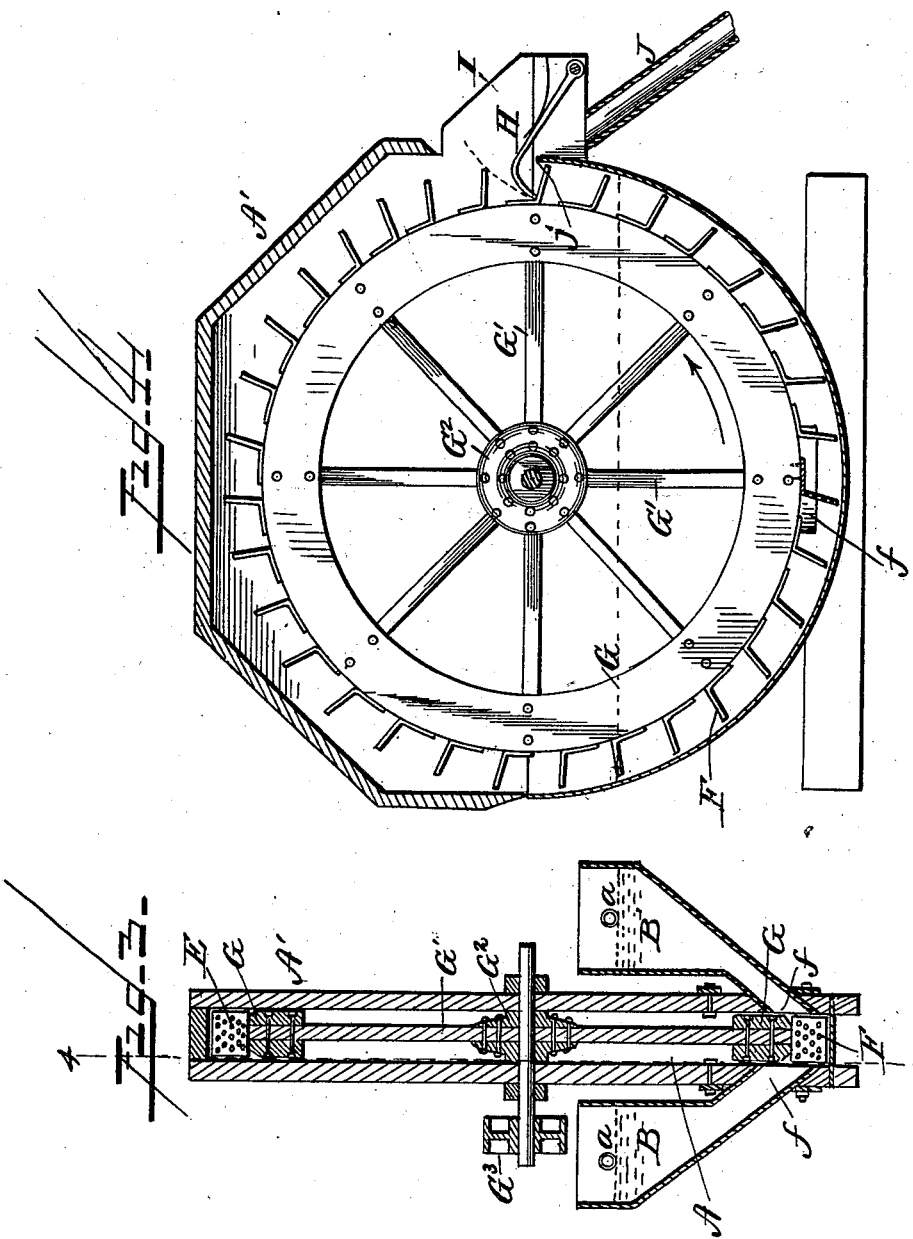

UNITED STATES PATENT OFFICE.

THOMAS T. GAFF, OF BARNSTABLE, MASSACHUSETTS, AND JOSEPH F. GENT, OF INDIANAPOLIS, INDIANA.

GRAIN-SEPARATING APPARATUS.

SPECIFICATION forming part of Letters Patent No. 687,220, dated November 26, 1901.

Application filed May 24, 1901. Serial No. 61,679. (No model.)

*To all whom it may concern:*

Be it known that we, THOMAS T. GAFF, of Barnstable, in the county of Barnstable and State of Massachusetts, and JOSEPH F. GENT, of Indianapolis, in the county of Marion and State of Indiana, have invented certain new and useful Improvements in Grain-Separating Apparatus, of which the following is a specification.

In an application for Letters Patent by Thomas T. Gaff, one of the applicants herein, for an improvement in the treatment of maize or Indian corn for obtaining corn-milling products, filed March 7, 1901, Serial No. 50,447, there is described a process of manufacture which involves the employment of a gravity-bath for the purpose of separating the coarsely-broken starch-bearing bits of grain from the germs.

Our invention is directed to an apparatus which primarily is designed to be used for that purpose, but which also can be used as a grain-washer wherever it is desired, as in milling, to rid the grain of bits of cob and other relatively lighter refuse before proceeding with its further treatment.

The apparatus which we have devised consists of two main parts—a tank to contain the liquid which constitutes the bath and an elevating mechanism comprising a chamber which is connected with the bottom or lower part of the tank, so as to receive the heavy material that sinks in the bath, and a series of perforated paddles or flights which move continuously through said chamber and which in size and contour correspond to the cross-sectional area and shape of said chamber, so that each paddle or flight will carry along before it all of the solid material which may be between it and the flight or paddle next in front, the outer and side walls of said chamber being formed by the walls of the case in which the chamber is located and the inner wall of the chamber being formed by the device which carries or supports the flights. These and other features of our invention can best be explained and understood by reference to the accompanying drawings, which represent the preferred embodiment of our improvements, and in which—

Figure 1 is a side elevation, partly in section, of the complete apparatus. Fig. 2 is an end elevation of the same. Fig. 3 is a cross-section on line 3 3, Fig. 1, the feed hoppers and chutes leading therefrom to the tanks being omitted. Fig. 4 is a section on line 4 4, Fig. 3, of the casing and the elevating mechanism contained therein.

A A' represent the casing containing the elevating mechanism, and B B' are the tanks containing the liquid. Two of these tanks are shown, one on each side of the casing. We prefer to use two tanks as a matter of convenience; but of course one only may be employed, if desired. Above each tank is a hopper C to contain the material to be treated, from which leads a chute D, which discharges into the tank. At the base of the hopper is a feed-roll $c$, which operates in connection with a concave $c'$ and is rotated by means of a pulley $c^2$, driven from any suitable source of power. By this means the material to be treated can be fed in regulated quantity to the tank. Each tank is provided at one end with an inflow-pipe $a$ for the liquid and at the opposite end with an overflow $b$, from which leads a chute $b'$ for carrying away the material floated off from the top of the bath. In practice while the apparatus is in operation there is a constant flow of liquid through the tank, the liquid which enters through pipe $a$ replacing that which overflows at $b$, the level of the liquid being indicated by the dotted lines in Fig. 1. Within the tank and just below the inner end of the inflow-pipe $a$ is a lip or plate $a'$, which is so inclined as to deflect the entering current upwardly and at the same time direct it toward the overflow, in this way assisting in floating off the light material.

It is desirable that means should be provided whereby all of the material which enters the tank should be submerged in the liquid. This is particularly desirable and, indeed, essential to complete separation in treating a mixture of germs and bits of starch-bearing portions of grain, for the reason that otherwise quite a percentage of the latter will not sink, but will be floated off with the germs. As a convenient means for this purpose (although we are not limited to this particular means) we make use of a flutter-wheel E, mounted in the tank at or near the discharge end of the chute D, so as to be partly submerged in the liquid and operating in connection with a concave e on the lower end of an inclined plate e' in the chute D, over and upon which the material descends from the hopper. The material passes between the flutter-wheel and the concave e, and is thus forcibly submerged in the bath. The starch-bearing portions of the grain are thus thoroughly wetted and will at once sink, while the deflecting-plate a' of the inflow-pipe stands in such relation to the concave e that the lighter material as it passes beyond the latter will be directed by the entering current toward the overflow.

The flutter-wheel E can be driven by any suitable means—as, for example, by a pulley E' belted to any suitable prime mover.

Each tank B is hopper-shaped and at its lower end communicates with the interior of the casing A A' at a point f near the bottom of the latter. The casing is composed of two portions. The lower portion A is water-tight. The upper portion A' is of wood or any other suitable material and is merely a cover for the elevating mechanism, being removable to permit access to the latter whenever desired. The lower part of the casing being in communication with the tanks is of course always filled with liquid to the same level as in the tanks.

Within the case A A' are the flights or paddles F, by which the material that enters the case is taken care of and finally discharged from the case. These flights travel continuously in one direction, and for this purpose may be mounted upon any suitable carrier. In the present instance they are attached to the rim G of a wheel having spokes G' and a hub G². The hub is journaled in the casing and is revolved by pulley G³, driven by suitable belting. The direction of revolution of the wheel is indicated by the arrow in Fig. 4. The flights or paddles are perforated, so as to allow the liquid to drain from the material after the paddles rise above the level of the bath, and they preferably slightly trail or incline to the rear relatively to the direction in which they move.

The lower half A of the case is semicylindrical in shape and of such size that the paddles at their outer edges will meet or nearly meet the outer wall of the case and their side edges will meet or nearly meet the side walls of the case. The flights or paddles thus move in what, in effect, is a chamber of which the sides and outer wall are formed by the case and the inner wall by the rim of the wheel to which the flights are secured. The heavy material from the tank B enters this chamber at the points f, is at once carried along by the flights F, and is lifted by them to a point j above the level of the liquid, where it can be discharged from the flights. After the material is thus raised above the level of the liquid and before it is discharged the liquid will drain from it through the perforations in the paddles. At the discharge-point j is a hinged or pivoted scraper H, contained in a housing I, from which leads a chute J. The acting end of this scraper overhangs the paddles, and it acts to clean each paddle successively, being lifted by the paddle until its end escapes therefrom, when it will at once drop to meet and act upon the next paddle in the same way. This scraper can be spring-pressed, if desired. The material falls from the paddles into the chute J, through which it is carried off to any desired point.

The discharge-point j from the chamber A into the chute J is about on a level with the axis of the wheel. Owing to the trail of the paddles they still incline downwardly and outwardly at the time they pass the discharge-point, as indicated in Fig. 4, thus being in a position to permit the scraper to act effectively to rid them of their load.

The wheel revolves slowly in order to disturb the liquid in the casing as little as possible.

Having described our improvements and the best way now known to us of carrying the same into practical effect, we state in conclusion that we do not limit ourselves narrowly to the structural details hereinbefore set forth in illustration of our invention; but

What we claim, and desire to secure by Letters Patent, is as follows:

1. In a separating apparatus a casing, a traveling carrier, and a series of elevating flights or paddles attached to said carrier, fitting snugly between the sides, and arranged to sweep over the floor, of the casing in a chamber of which the sides and outer wall are formed by the casing and the inner wall by the carrier; and a separating-tank containing the bath in which the materials are separated by gravity, and communicating at its lower end with the lower part of the said chamber in the casing, substantially as and for the purposes hereinbefore set forth.

2. The combination of the casing, the separating-tank communicating at its lower end with the lower part of the casing, the traveling carrier and the series of elevating flights or paddles attached to the same and arranged to sweep over the floor of the casing, and an automatic scraper adapted to operate upon each paddle as it rises above the surface of the liquid in the casing and reaches the discharge-point in the casing, substantially as and for the purposes hereinbefore set forth.

3. The separating-tank, having a hopper-shaped bottom, an inflow-pipe for the liquid which forms a bath, and an overflow for the liquid, in combination with means by which the material to be treated as it enters the tank is forced below the surface of the liquid therein, and a deflecting-plate by which the entering current of liquid is directed, crosswise of the column of submerged material, upwardly and toward the overflow substantially as and for the purposes hereinbefore set forth.

4. The casing connected to the tank which contains the bath, in combination with the wheel mounted to revolve therein, the perforated elevating flights or paddles attached to the rim of said wheel, and the scraping device for acting upon the paddles as they successively rise above the level of the liquid in the casing, substantially as and for the purposes hereinbefore set forth.

In testimony whereof we have hereunto set our hands this 20th day of May, 1901.

THOMAS T. GAFF.
JOSEPH F. GENT.

Witnesses:
FRANZ C. BEPP,
KARL T. GENT.